US011831001B2

(12) United States Patent
Chen et al.

(10) Patent No.: US 11,831,001 B2
(45) Date of Patent: Nov. 28, 2023

(54) PRE-LITHIATION METHOD AND PRE-LITHIATED LITHIUM-ION SECONDARY BATTERY

(71) Applicant: SAFT AMERICA, Cockeysville, MD (US)

(72) Inventors: Xilin Chen, Lutherville Timonium, MD (US); Frank Cao, North Potomac, MD (US); Tyler Ruff, Hanover, PA (US); Jian Dong, Lutherville Timonium, MD (US); Carine Margez Steinway, Baltimore, MD (US); Thomas Greszler, Phoenix, MD (US); Kamen Nechev, Baldwin, MD (US)

(73) Assignee: SAFT AMERICA, Cockeysville, MD (US)

( * ) Notice: Subject to any disclaimer, the term of this patent is extended or adjusted under 35 U.S.C. 154(b) by 139 days.

(21) Appl. No.: 17/319,654

(22) Filed: May 13, 2021

(65) Prior Publication Data
US 2022/0367842 A1 Nov. 17, 2022

(51) Int. Cl.
| | |
|---|---|
| *H01M 4/04* | (2006.01) |
| *H01M 4/58* | (2010.01) |
| *H01M 10/0525* | (2010.01) |
| *H01M 10/44* | (2006.01) |
| *H01M 4/02* | (2006.01) |

(52) U.S. Cl.
CPC ........... *H01M 4/04* (2013.01); *H01M 4/5825* (2013.01); *H01M 10/0525* (2013.01); *H01M 10/446* (2013.01); *H01M 2004/028* (2013.01)

(58) Field of Classification Search
CPC .... H01M 4/04; H01M 4/0402; H01M 4/0459; H01M 4/0471; H01M 4/5825; H01M 10/0525; H01M 10/052; H01M 10/446; H01M 10/44; H01M 10/448; H01M 2004/028
See application file for complete search history.

(56) References Cited

U.S. PATENT DOCUMENTS

| | | | |
|---|---|---|---|
| 9,385,397 B2 * | 7/2016 | Zhamu | H01G 11/06 |
| 2015/0364795 A1 | 12/2015 | Stefan et al. | |
| 2021/0075001 A1 * | 3/2021 | Oleshko | H01M 4/666 |

FOREIGN PATENT DOCUMENTS

| | | |
|---|---|---|
| CN | 103872289 A | 6/2014 |
| CN | 109671999 A | 4/2019 |
| EP | 3155687 A1 | 4/2017 |
| JP | 2013-211116 A | 10/2013 |
| WO | 2015/192051 A1 | 12/2015 |
| WO | 2019/070896 A1 | 4/2019 |

OTHER PUBLICATIONS

Extended European Search Report dated Sep. 29, 2022 in European Application No. 22170727.6.
Vanchiappan Aravindan et al., "Electrochemical Route to Alleviate Irreversible Capacity Loss from Conversion Type α-Fe2O3 Anodes by LiVPO4F Prelithiation", Applied Energy Materials, 2018, vol. 1, pp. 5198-5202 (5 pages total).
Jiexi Wang, et al., Systematic investigation on determining chemical diffusion coefficients of lithium ion in Li1+xVPO4F (0≤x≤2), J Solid State Electrochem, Jul. 29, 2014, 8 pages.
Florian Holtstiege, et al., "Pre-Lithiation Strategies for Rechargeable Energy Storage Technologies: Concepts, Promises and Challenges", MDPI, Batteries, Jan. 23, 2018, pp. 1-39.

* cited by examiner

*Primary Examiner* — Raymond Alejandro
(74) *Attorney, Agent, or Firm* — Sughrue Mion, PLLC (57) ABSTRACT

Pre-lithiation methods using lithium vanadium fluorophosphate (e.g., LiVPO4F and its derivatives) ("LVPF") as a cathode active material in a lithium-ion secondary battery. The pre-lithiation methods include compensating for an expected loss of active lithium by selecting LVPF having a specific pre-lithiated chemistry (or a blend of LVPF selected to have a specific pre-lithiated chemistry) and selecting a total amount of the pre-lithiated LVPF. The pre-lithiation methods may include initially charging the lithium-ion secondary battery at the lower of the two charge/discharge plateaus of LVPF to release active lithium.

19 Claims, 3 Drawing Sheets
(3 of 3 Drawing Sheet(s) Filed in Color)

FIG. 4 - Cycling Data - 1.2 N/P Ratio

FIG. 5 - Cycling Data - 1.3 N/P Ratio

PRE-LITHIATION METHOD AND PRE-LITHIATED LITHIUM-ION SECONDARY BATTERY

BACKGROUND

Technical Field

The present disclosure relates to a method of pre-lithiation using lithium vanadium fluorophosphate and a pre-lithiated lithium-ion secondary battery obtained by the method.

Description of Related Art

In a lithium-ion secondary battery, an active material is a material which participates in the electrochemical reactions to produce electrical energy when the secondary cell is discharging. Known cathode (or positive electrode) active materials include NCA, NMC, LFP, LMP, LFMP, LCP, LCO, LNO, LMO, LNMO, and LVPF (each of which are explained in more detail below). The active lithium content is stored within the cathode, prior to operation of the battery, via the cathode active material. Known anode (or negative electrode) active materials include carbon-based materials, such as graphite and coke, alloy-based negative electrode active materials such as Si and/or Sn, $SiO_x$, lithium metal, a lithium titanate oxide (LTO), or blends thereof.

It is well known that many of these active materials suffer from high first cycle active lithium losses, which may be caused, for example, by the formation of a solid electrolyte interphase (also referred to as a SEI, a SEI film, and a SEI layer). More specifically, during the first charge of the cell (the formation cycle), a certain amount of active lithium is typically lost, mostly by SEI formation at the negative electrode, depending on the electrode active material, so that the remaining active lithium content is reduced after the first charge/discharge cycle. The loss of active lithium can permanently decrease the available energy by the consumption of lithium from the positive electrode material.

In particular, it is well known that carbon and graphite anode materials may consume a significant amount of active lithium during the initial cycles of the battery due to formation of the SEI.

There can also be ongoing loss of lithium after the first cycle. For example, when Si and/or Sn is used as the anode material, which are metals forming an alloy with lithium, it is well known that the anode material is subject to large volume changes during the charge/discharge cycle. The expansion and contraction of this anode material may result in SEI breakage and reformation, which may result in an ongoing loss of lithium.

In other words, the losses of active lithium summarized above result in a loss of active species ($Li^+$) over time (i.e., capacity fade).

It is also known that lithium-ion batteries may increase their internal resistance over time (i.e., power fade).

Pre-lithiation refers to methods for compensating for the irreversible loss of lithium, thereby increasing the practical (gravimetric/volumetric) energy density, improving cycling columbic efficiency (increased reversible capacity) and stability, and prolonging or extending the life of the lithium-ion battery.

Various pre-lithiation techniques have been developed, including electrochemical and chemical pre-lithiation, pre-lithiation with the help of additives, and the pre-lithiation by direct contact to lithium metal. These are described, for example, in Florian Holtstiege et al., *Pre-Lithiation Strategies for Rechargeable Energy Storage Technologies: Concepts, Promises and Challenges*, 4 BATTERIES, pages 1-39 (2018), which is incorporated herein by reference in its entirety. Holtstiege et al. define pre-lithiation as the addition of lithium to the active lithium content (reversibly transferable lithium ions between positive and negative electrode) of a lithium-ion battery prior to battery cell operation.

Holtstiege et al. explain that one pre-lithiation method includes storing a certain amount of active lithium (e.g., metallic lithium powders) in the negative electrode by pre-lithiation prior to the first cycle to at least partially compensate for the first cycle loss of active lithium, thereby enhancing remaining cell energy. However, a problem or limitation of this method is that the lithium powder is dangerous because of its reactivity and flammability. Further, the strong reactivity of the active lithium is not compatible with existing aqueous based negative electrode processing. For example, the active lithium can react with oxygen and moisture during solvent based slurry preparation and result in short shelf-life of the slurry. In addition, the active lithium can also react with oxygen and trace amount of moisture in dry rooms during cell assembly. Thus, it is not only a technical challenge to adopt metallic lithium powders in negative electrodes, but there are also environmental and safety risks for producing such a cell.

Another pre-lithiation method includes using pre-lithiation additives inside the positive electrode. However, a problem or limitation of this method is the remaining solid residue from the additives after releasing lithium. The residue is not an active material anymore for lithium intercalation, or the residue may not be stable or compatible with the electrolyte, which not only undermines the benefit of any improvement in cell energy density but also impairs cell cycle life. In addition, some of the additives can become safety risks when the cells are operated under extreme conditions.

Holtstiege et al. explain that increasing the remaining amount of active lithium inside the cell during ongoing charge/discharge cycling leads to increased reversible capacity and increased energy density, which can be shown by a substantially increased Coulombic efficiency of the first cycle and an increased discharge capacity over a few numbers of cycles.

However, Holtstiege et al. warn that the degree of pre-lithiation has to be adjusted with high accuracy. For example, an excess of lithium can result in metal plating on the negative electrode, resulting in safety hazards during operation.

Figure 1:
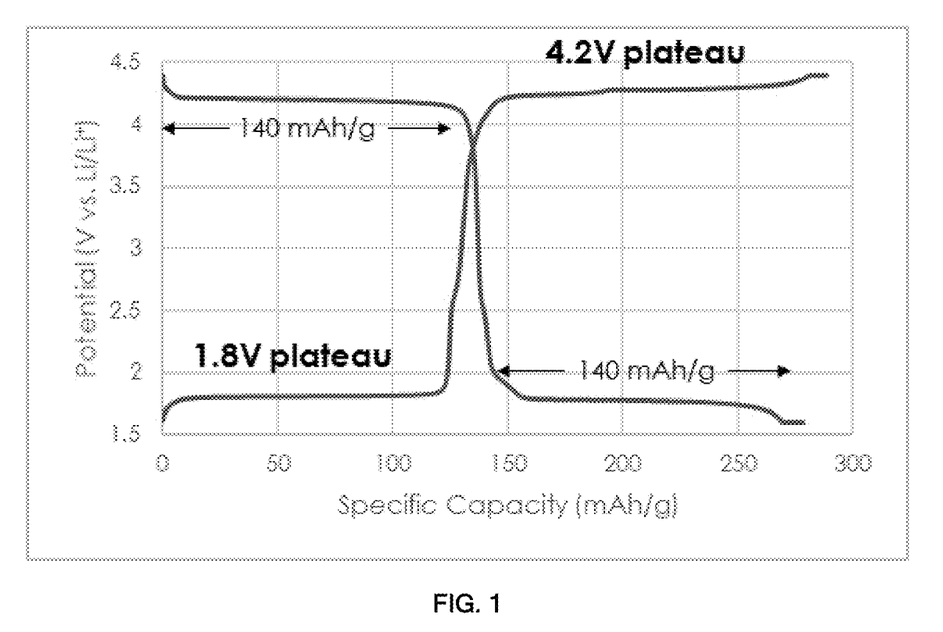
FIG. 1 is a chart showing the two charge/discharge plateaus of lithium vanadium fluorophosphate.

Lithium vanadium fluorophosphate (e.g., $LiVPO_4F$ and its derivatives) (LVPF) is a known cathode active material that has a relatively high energy density (compared to many conventionally used cathode materials) from its charge and discharge plateau of about 4.2 V vs. $Li^+/Li$ (the $V^{4+}/V^{3+}$ redox pair), which, respectively, correspond to the intercalation and deintercalation of lithium ions. Lithium vanadium fluorophosphate can also operate at a lower charge and discharge plateau of about 1.8 V vs. $Li^+/Li$ (the $V^{3+}/V^{2+}$ redox pair). Each plateau has about 140 mAh/g capacity separately. The two charge/discharge plateaus of lithium vanadium fluorophosphate are shown in FIG. 1.

SUMMARY OF THE DISCLOSURE

Aspects of certain embodiments of the present disclosure overcome the above disadvantages and/or other disadvantages not described above. However, aspects of the embodiments are not required to overcome the disadvantages described above, and aspects of the embodiments may not overcome any of the disadvantages described above.

The embodiments of the present disclosure are directed to pre-lithiation methods using lithium vanadium fluorophosphate (e.g., LiVPO$_4$F and its derivatives) (also referred to herein as "LVPF") as a cathode active material in a lithium-ion secondary battery. More specifically, the pre-lithiation methods include compensating for an expected loss of active lithium by selecting LVPF having a specific pre-lithiated chemistry (or a blend of LVPF selected to have a specific pre-lithiated chemistry) and selecting a total amount of the pre-lithiated LVPF (for example, a loading amount (e.g., mg/cm$^2$) of the pre-lithiated LVPF material to be added to the positive electrode).

In one aspect, the present disclosure provides a method of making a lithium-ion battery having a cathode, an anode, and an electrolytic solution, the cathode including a cathode active material including at least a lithium vanadium fluorophosphate (LVPF) represented by Formula (1) (Li$_{1+x}$V$_{1-y}$M$_y$PO$_4$F$_z$, where 0.05<x≤1; 0≤y≤0.5; 0.8≤z≤1.2; and M is one or more of Ti, Al, Mg, Mn, Fe, Co, Y, Cr, Cu, Ni, and Zr), the method including:
(A) determining an expected capacity loss of the battery due to a loss of lithium during a first cycle and/or cycles following the first cycle;
(B) adjusting a degree of pre-lithiation to compensate for the expected capacity loss by: (B1) selecting a value for x in the Formula (1), and (B2) selecting a total amount of the LVPF according to the Formula (1) in the cathode;
(C) preparing the cathode comprising the total amount of LVPF according to the Formula (1); and
(D) assembling the battery.

In one aspect of the method, the use of the LVPF according to the Formula (1) provides several benefits as a result of the lithium vanadium fluorophosphate having the voltage plateaus at about 1.8V (V$^{2+}$/V$^{3+}$) and at about 4.2V (V$^{3+}$/V$^{4+}$). In particular, the lithium released from the low voltage plateau of about 1.8V can be utilized in the first cycle (or initial charging) to safely provide the battery with excess lithium, thereby compensating for lithium loss on the anode side. As a result, the lithium released from the 4.2V plateau (and/or the lithium released from other cathode materials blended with the LVPF, such as NCA, NMC, LFP, LMP, LFMP, LCP, LCO, LNO, LMO, and LNMO) can potentially be fully used in following cycles, thereby improving cycling efficiency and stability.

In one aspect of the method, adjusting the degree of pre-lithiation in step (B) can be easily controlled by the level of the lithiation of the 1.8V plateau of LiVPO$_4$F. This is a safe and controllable pre-lithiation method compared with conventional methods of pre-lithiation, such as using metallic lithium.

In particular, it should be clear, for example, that selecting x=0.05 in the Formula (1) corresponds to about 5% extra lithium (mole %) compared to the use of LiVPO$_4$F; that selecting x=0.1 corresponds to about 10% extra lithium; that selecting x=0.3 corresponds to about 30% extra lithium; etc. Accordingly, for example, selecting the value for x and selecting the total amount of the LVPF can be utilized to balance the loss of active lithium during the initial charging and subsequent cycles. Put another way, the step (B) can be utilized to pay off (or compensate for) the anode's need for lithium during the first cycles of the battery.

In addition, in one aspect of the method, adding the LVPF having the adjusted degree of pre-lithiation into the cathode may also limit the anode potential to be lower than about 1.8V vs. lithium reference electrode, such that, for example, the anode current collector (e.g., Cu) is stable. This may, for example, allow 0V storage to become practical without sacrificing battery life.

In another aspect, the step (B) of adjusting the degree of pre-lithiation may provide a first cycle reversible capacity close to the designed or theoretical reversible capacity. Generally, this means that the active cathode materials can be fully utilized, which would maximize cell energy density.

In another aspect, the method may provide a first cycle reversible capacity that is at least 85%, at least 90%, at least 95%, etc. of designed capacity or theoretical capacity.

In another aspect, the method may provide a second cycle capacity that is close to design capacity.

In another aspect, the method includes performing the first cycle (or initial charging) by:
(E) initially charging the battery at a charge plateau of about 1.5-2.0 V vs. Li$^+$/Li (V$^{3+}$/V$^{2+}$ redox pair); and
(F) subsequently charging the battery at a charge plateau of about 4.0-4.3 V vs. Li$^+$/Li (V$^{4+}$/V$^{3+}$ redox pair).

In some aspects, the method may include, after charging the battery in the step (F) at the charge plateau of about 4.0-4.3 V, repeatedly cycling the battery between about 3 V to 4.2-4.5 V. By cycling the battery in this manner, the initial charging of the battery at the lower voltage plateau safely releases the extra lithium stored in the LVPF to increase reversible capacity, while the subsequent cycling of the battery can be performed at a useful voltage.

In some aspects, the lithium released from the LVPF during the initial charging may compensate for the loss of lithium in the first cycle and/or following cycles. For example, the lithium released from the LVPF during the initial charging may compensate for at least 85%, at least 90%, at least 95%, at least 97.5%, at least 99%, or at least about 100% of the lost lithium.

In some aspects, x in Formula (1) may be any value equal to or greater than 0.05. Thus, in some aspects, 0.10<x≤1, 0.15<x≤1, 0.20<x≤1, 0.25<x≤1, 0.30<x≤1, 0.35<x≤1, 0.40<x≤1, 0.45<x≤1, 0.50<x≤1, 0.55<x≤1, 0.60<x≤1, 0.65<x≤1, 0.70<x≤1, 0.75<x≤1, 0.80<x≤1, 0.85<x≤1, 0.90<x≤1, 0.95<x≤1, or x=~1.

In some aspects, the LVPF represented by the Formula (1) may be Li$_{1+x}$VPO$_4$F.

In some aspects, selecting the value for x in step (B1) may include obtaining the LVPF represented by the Formula (1) having the value for x.

In some aspects, selecting the value for x in step (B1) may include synthesizing the LVPF represented by the Formula (1) having the value for x.

In some aspects, selecting the value for x in step (B1) may include blending two or more lithium vanadium fluorophosphates having different chemistries (e.g., blending LiVPO$_4$F and Li$_2$VPO$_4$F in an appropriate ratio).

In some aspects, selecting the value for x in step (B1) may include blending a lithium vanadium fluorophosphate represented by the following Formula (2) with a lithium vanadium fluorophosphate represented by the following Formula (3) to provide the LVPF having the chemistry according to the Formula (1):

$$Li_{1+a}V_{1-y1}M_{y1}PO_4F_{z1} \qquad \text{Formula (2),}$$

$$Li_{2-b}V_{1-y2}M_{y2}PO_4F_{z2} \qquad \text{Formula (3),}$$

wherein, in Formula (2) and Formula (3), 0≤y1≤0.5; 0≤y2≤0.5; 0.8≤z1≤1.2; 0.8≤z2≤1.2; 0≤a≤1; and 0≤b≤1, and when a ratio between the Formula (2) and the Formula (3) is r:(1−r), the x in Formula (1) would be ((1+a)*r)+((2−b)*(1−r))−1, wherein 0<r<1.

In some aspects, the cathode active material may include a second cathode active material in a mixture with the LVPF.

In some aspects, when the cathode active material includes the second cathode active material, a weight ratio of the LVPF according to Formula (1) to the second cathode active material is r:(1−r), wherein 0<r<1. In any one of the aspects of the present disclosure, with regard to the weight ratio (r:(1−r)) of the blend of the LVPF to the second active material, the value r corresponding to the weight of the first active material can be any value greater than 0 and less than 1. For example, the value for r may be 0.1≤r≤0.9, 0.2≤r≤0.9, 0.3≤r≤0.9, 0.4≤r≤0.9, 0.5≤r≤0.9, 0.6≤r≤0.9, 0.7≤r≤0.9, 0.8≤r≤0.9

In some aspects, when the cathode active material includes the second cathode active material, the second cathode active material may be represented by one of the following Formulas (A) to (D) or a blend thereof:

$$Li_{1+x}M1_aX_bPO_4 \quad \text{Formula (A)},$$

wherein, in Formula (A), M1 is at least one selected from Fe, Mn, and Co; X is at least one transition metal selected from Ni, V, Y, Mg, Ca, Ba, Al, Sc, and Nd; 0≤x≤0.15; a>0; b≥0; and optionally a+b=1, $$Li_{1+x}Ni_aM2_dM3_eO_2 \quad \text{Formula (B)},$$

wherein, in Formula (B), M2 is at least one selected from Co, Al, and Mn; M3 is one or more selected from B, Mg, Si, Ca, Ti, V, Cr, Mn, Fe, Cu, Zn, Y, Zr, Nb, W, Mo, Sr, Ce, Ga, and Ta; 0≤x≤0.15; a>0; d>0; e≥0; and optionally a+d+e=1, $$Li_{1+x}Mn_2O_4 \quad \text{Formula (C)},$$

wherein, in Formula (C), 0≤x≤0.15, $$Li_{1+x}CoO_2 \quad \text{Formula (D)},$$

wherein, in Formula (D), 0≤x≤0.15.

The second active material and/or an amount thereof (relative to the amount of the LVPF) may be selected for generating a voltage slope at the beginning of charge and end of discharge. The second active material and/or an amount thereof (relative to the amount of the LVPF) may be selected for achieving one or more of a higher energy density, an improved cycling life, and/or an improved rate capacity.

In some aspects, the second cathode active material may be represented by one of the following Formula (A1) to (A4) or a blend thereof:

$$Li_{1+x}FePO_4 \quad \text{Formula (A1)},$$

wherein, in Formula (A1), 0≤x≤0.15, $$Li_{1+x}MnPO_4 \quad \text{Formula (A2)},$$

wherein, in Formula (A2), 0≤x≤0.15, $$Li_{1+x}CoPO_4 \quad \text{Formula (A3)},$$

wherein, in Formula (A3), 0≤x≤0.15, $$Li_{1+x}Fe_yMn_zX_bPO_4 \quad \text{Formula (A4)},$$

wherein, in Formula (A4), X is at least one transition metal selected Ni, V, Y, Mg, Ca, Ba, Al, Sc, and Nd; 0≤x≤0.15; y>0; z>0; b≥0; and optionally y+z+b=1.

In some aspects, the second cathode active may be represented by one of the following Formula (B1) to (B4) or a blend thereof:

$$Li_w(Ni_xMn_yCo_zM_t)O_2 \quad \text{Formula (B1)},$$

wherein, in Formula (B1), 0.9≤w≤1.1; x>0; y>0; z>0; t≥0; M is one or more selected from Al, B, Mg, Si, Ca, Ti, V, Cr, Fe, Cu, Zn, Y, Zr, Nb, W, Mo, Sr, Ce, Ga, and Ta; and optionally x+y+z+t=1, $$Li_{1+x}Ni_aMn_bO_2 \quad \text{Formula (B2)},$$

wherein, in Formula (B2), 0≤x≤0.15; a>0; b>0; and optionally a+b=1, $$Li_w(Ni_xCo_yAl_zM_t)O_2 \quad \text{Formula (B3)},$$

wherein, in Formula (B3), 0.9≤w≤1.1; x>0; y>0; z>0; t≥0; M is one or more selected from B, Mg, Si, Ca, Ti, V, Cr, Mn, Fe, Cu, Zn, Y, Zr, Nb, W, Mo, Sr, Ce, Ga, and Ta; and optionally x+y+z+t=1, $$Li_{1+x}Ni_aMn_bCo_cAl_dO_2 \quad \text{Formula (B4)},$$

wherein, in Formula (B4), 0≤x≤0.15; a>0; b>0; c>0; d>0; and optionally a+b+c+d=1.

In some aspects, the anode may include one or more anode active materials selected from graphite, coke, Si, Sn, SiO$_x$, lithium metal, lithium titanate oxide (LTO), and blends thereof.

In some aspects, determining the expected first cycle capacity loss in step (A) may include quantifying capacity loss due to formation of a solid electrolyte interphase (SEI) layer on the anode during the first cycle and/or the cycles following the first cycle.

In some aspects, about 5 to about 20% of lithium from the cathode active material may be lost in the first cycle, and selecting the value for x in the Formula (1) in step (B1) and selecting the total amount of the LVPF according to the Formula (1) in step (B2) compensates for substantially all of the lithium lost in the first cycle. Herein, "substantially all" means at least about 85%, at least about 90%, at least about 95%, at least about 99%, or at least about 100% of the lithium lost.

In some aspects, selecting the value for x in the Formula (1) in step (B1) and selecting the total amount of the LVPF according to the Formula (1) in step (B2) compensates for substantially all of the lithium lost in the first cycle and the cycles following the first cycle.

In some aspects, selecting the value for x in the Formula (1) in step (B1) and selecting the total amount of the LVPF according to the Formula (1) in step (B2) compensates for all of the lithium lost in the first cycle and the cycles following the first cycle.

In some aspects, the total amount of the cathode active material including the LVPF according to Formula (1) (in combination with the optional second cathode active material) may fall within a range of about 1 mg/cm$^2$ to about 50 mg/cm$^2$ per side, and the actual amount may be any value within this range (e.g., about 1 to 10 mg/cm$^2$ per side, about 11 to 20 mg/cm$^2$ per side, about 21 to 30 mg/cm$^2$ per side, about 31 to 40 mg/cm$^2$ per side, or about 41 to 50 mg/cm$^2$ per side).

In another embodiment, the present disclosure provides a lithium-ion battery prepared according to the methods described herein.

In another embodiment, the present disclosure provides a lithium-ion battery having a cathode, an anode, and an electrolytic solution, the cathode including a cathode active material including a LVPF according to the Formula (1) defined above, wherein the lithium-ion secondary battery has not been subjected to an initial charging.

In one aspect, the lithium-ion secondary battery, which has not been subjected to an initial charging, does not have a SEI on the anode. That is, no SEI is present or disposed on the anode, because a SEI is not formed until during the initial charging or first cycle.

Additional features and advantages of the present disclosure are described further below. This summary section is meant merely to illustrate certain features of the disclosure, and is not meant to limit the scope of the disclosure in any way. The failure to discuss a specific feature or embodiment of the disclosure, or the inclusion of one or more features in this summary section, should not be construed to limit the claims.

BRIEF DESCRIPTION OF THE FIGURES

The application file contains at least one drawing executed in color. Copies of this patent application publication with color drawing(s) will be provided by the Office upon request and payment of the necessary fee.

Any figures contained herein are provided only by way of example and not by way of limitation.

DETAILED DESCRIPTION OF THE EMBODIMENTS OF THE DISCLOSURE

It is to be understood that both the foregoing general description and the following detailed description are exemplary and are intended to provide further explanation of the claims. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Any range will be understood to encompass and be a disclosure of each discrete point and subrange within the range.

Unless defined otherwise, all technical and scientific terms used herein have the same meaning as commonly understood by one of ordinary skill in the art to which this disclosure belongs. Any methods and materials similar or equivalent to those described herein may be used in the practice or testing of the disclosure, as it will be understood that modifications and variations are encompassed within the spirit and scope of the instant disclosure.

As used herein, "about," "approximately," "substantially," and "significantly" will be understood by a person of ordinary skill in the art and will vary in some extent depending on the context in which they are used. If there are uses of the term which are not clear to persons of ordinary skill in the art given the context in which it is used, "about" and "approximately" will mean plus or minus <10% of particular term, and "substantially" and "significantly" will mean plus or minus >10% of the particular term. "Comprising" and "consisting essentially of" have their customary meaning in the art.

Lithium Vanadium Fluorophosphate (LVPF)

Lithium vanadium phosphate (or LVPF) is a known material for use as a positive electrode material in lithium-ion batteries.

The LVPF used in the pre-lithiation methods and pre-lithiated lithium-ion secondary batteries of the present disclosure has a chemistry according to the Formula (1) described herein:

$$Li_{1+x}V_{1-y}M_yPO_4F_z \qquad \text{Formula (1)}$$

wherein $0.05 < x \leq 1$; $0 \leq y \leq 0.5$; $0.8 \leq z \leq 1.2$; and M is one or more selected from Ti, Al, Mg, Mn, Fe, Co, Y, Cr, Cu, Ni, and Zr.

In some aspects, when y is greater than 0 (i.e., when at least one of the elements M is included), the LVPF may alternatively be referred to as a LVPF derivative.

Among LVPF derivatives, $LiV_{1-y}Y_yPO_4F$ ($0<y\leq 0.5$), $LiV_{1-y}Cr_yPO_4F$ ($0<y\leq 0.5$), $LiV_{1-y}Mn_yPO_4F$ ($0<y\leq 0.5$), $LiV_{1-y}Ti_yPO_4F$ ($0<y\leq 0.5$), and $LiV_{1-y}Fe_yPO_4F$ ($0<y\leq 0.5$) are particularly contemplated.

In some aspects, y is 0 (i.e., the element M is not included).

As explained herein above, the LVPF according to the Formula (1) can be obtained by blending the Formula (2) with the Formula (3).

The LVPF according to the Formula (1) may also be referred to herein as pre-lithiated LVPF.

Lithium-Ion Secondary Battery

The present disclosure provides a (pre-lithiated) lithium-ion secondary battery obtained by the pre-lithiation methods of the present disclosure.

An assembled lithium-ion secondary battery according to the present disclosure includes, for example, a cathode having the positive electrode active material including at least the LVPF according to the Formula (1), an anode, and an electrolytic solution. A separator may be disposed between the anode and the cathode.

The individual electrochemical cells of the present disclosure can be of any known type, such as cylindrical cell, button cell, prismatic cell, and pouch.

Cathode (Positive Electrode)

The structure of the cathode is not particularly limited, except that the cathode active material includes at least the LVPF according to the Formula (I) on a current collector. The cathode may include one or more binder materials and may include one or more conductive materials in mixture with the active material.

The current collector is not particularly limited and known materials and designs may be used. In a preferred embodiment, the current collector is a two-dimensional conducting support such as a solid or perforated sheet, based on carbon or metal, for example aluminum, nickel, steel, stainless steel, or carbon coated aluminum.

The binder material is not particularly limited and known materials for this function can be used. For example, the binder material may contain one or more of the following components: polyvinylidene fluoride (PVdF) and its copolymers, polytetrafluoroethylene (PTFE), polyacrylonitrile (PAN), polymethyl or polybutyl methacrylate, polyvinyl chloride (PVC), polyvinylformal, polyesters and amide block polyethers, polymers of acrylic acid, methylacrylic acid, acrylamide, itaconic acid, sulfonic acid, and their derivatives with lithium salt elastomers and cellulose compounds.

Among the elastomers which may be used, mention may be made of ethylene/propylene/diene terpolymers (EPDM), styrene/butadiene copolymers (SBR), acrylonitrile/butadiene copolymers (NBR), styrene/butadiene/styrene block copolymers (SBS) or styrene/acrylonitrile/styrene block copolymers (SIS), styrene/ethylene/butylene/styrene copolymers (SEBS), styrene/butadiene/vinylpyridine terpolymers (SBVR), polyurethanes (PU), neoprenes, polyisobutylenes (PIB), butyl rubbers and mixtures thereof.

The cellulose compound may be, for example, a carboxymethylcellulose (CMC), a hydroxypropylmethylcellulose (HPMC), a hydroxypropylcellulose (HPC), a hydroxyethylcellulose (HEC) or other cellulose derivative.

The conductive material is not particularly limited and any known conductive material can be used. For example, the conductive material can be selected from graphite, carbon black, acetylene black (AB), carbon nanotubes (CNT), carbon fiber (CF), graphene, graphene oxide (GO), soot or one of their mixtures.

Methods of making cathodes are well known. For example, the cathode active material can be combined with a binder material and/or a conductive material and applied to a current collector by a known method. For example, granules including the cathode material could be formed and pressed to the current collector by a known method, or a slurry including the cathode material and a solvent could be coated on the current collector and then dried by a known method.

The amounts of a binder, conductive material, and other additives are not particularly limited, and suitable ratios are well known in the art. The amount of the conductive material is preferably 1 wt % to 20 wt % (or any amount within this range, e.g., 4 wt % to 18 wt %), and the amount of the binder is preferably 1 wt % to 20 wt % (or any amount within this range, e.g., 1 wt % to 7 wt %), when a total weight of the positive electrode material is considered 100 wt %.

Optional Second Cathode Active Material

In some aspects, the cathode active material may include a blend of the LVPF according to the Formula (1) with a second cathode active material.

The second cathode active material can be any known cathode active material other than LVPF. In some embodiments, the second active material is one of the following well-known materials NCA, NMC, LFP, LMP, optionally-doped LFMP, LCP, LCO, LNO, LMO, or LNMO or a blend thereof. The second active material can be generally represented by one or more of the following formulae (A) to (D).

Formula (A) (e.g., LFP, LMP, LCP, and Optionally-Doped LFMP)

The second active material may be represented by the following Formula (A):

$$\text{Li}_{1+x}\text{M1}_a\text{X}_b\text{PO}_4 \qquad \text{Formula (A)},$$

wherein, in Formula (A), M1 is at least one selected from Fe, Mn or Co; X is at least one transition metal selected from Ni, V, Y, Mg, Ca, Ba, Al, Sc, or Nd; 0≤x≤0.15; a>0; b≥0; and optionally a+b=1.

More specifically, the second active material according to the Formula (A) may be one of the following Formula (A1) (i.e., LFP), Formula (A2) (i.e., LMP), Formula (A3) (i.e., LCP) or Formula (A4) (i.e., optionally-doped LFMP) or a blend thereof:

$$\text{Li}_{1+x}\text{FePO}_4 \qquad \text{Formula (A1)},$$

wherein, in Formula (A1), 0≤x≤0.15;

$$\text{Li}_{1+x}\text{MnPO}_4 \qquad \text{Formula (A2)},$$

wherein, in Formula (A2), 0≤x≤0.15;

$$\text{Li}_{1+x}\text{CoPO}_4 \qquad \text{Formula (A3)},$$

wherein, in Formula (A3), 0≤x≤0.15;

$$\text{Li}_{1+x}\text{Fe}_y\text{Mn}_z\text{X}_b\text{PO}_4 \qquad \text{Formula (A4)},$$

wherein, in Formula (A4), X is at least one transition metal selected from Ni, V, Y, Mg, Ca, Ba, Al, Sc, or Nd; 0≤x≤0.15; y>0; z>0; b≥0; and optionally y+z+b=1.

As used herein, the general term "LFP" means Formula (A1), the general term "LMP" means Formula (A2), the general term "LCP" means Formula (A3), and the general terms "optionally-doped LFMP" or "LFMP" alone mean Formula (A4).

Formula (B) (e.g., NMC, LNMO, NCA, and NMCA)

The second active material may be represented by the following Formula (B):

$$\text{Li}_{1+x}\text{Ni}_a\text{M2}_d\text{M3}_e\text{O}_2 \qquad \text{Formula (B)},$$

wherein, in Formula (B), M2 is at least one selected from Co, Al or Mn; M3 is at least one of B, Mg, Si, Ca, Ti, V, Cr, Mn, Fe, Cu, Zn, Y, Zr, Nb, W, Mo, Sr, Ce, Ga, Ta, or mixtures thereof; 0≤x≤0.15; a>0; d>0; e≥0; and optionally a+d+e=1.

More specifically, the second active material according to the Formula (A) can be one of the following Formula (B1) to (B4):

$$\text{Li}_w(\text{Ni}_x\text{Mn}_y\text{Co}_z\text{M}_t)\text{O}_2 \qquad \text{Formula (B1)},$$

wherein, in Formula (B1), 0.9≤w≤1.1; x>0; y>0; z>0; t≥0; M is at least one of Al, B, Mg, Si, Ca, Ti, V, Cr, Fe, Cu, Zn, Y, Zr, Nb, W, Mo, Sr, Ce, Ga, Ta, or mixtures thereof; and optionally x+y+z+t=1;

$$\text{Li}_{1+x}\text{Ni}_a\text{Mn}_b\text{O}_2 \qquad \text{Formula (B2)},$$

wherein, in Formula (B2), 0≤x≤0.15; a>0; b>0; and optionally a+b=1;

$$\text{Li}_w(\text{Ni}_x\text{Co}_y\text{Al}_z\text{M}_t)\text{O}_2 \qquad \text{Formula (B3)},$$

wherein, in Formula (B3), 0.9≤w≤1.1; x>0; y>0; z>0; t≥0; M is at least one of B, Mg, Si, Ca, Ti, V, Cr, Mn, Fe, Cu, Zn, Y, Zr, Nb, W, Mo, Sr, Ce, Ga, Ta, or mixtures thereof; and optionally x+y+z+t=1;

$$\text{Li}_{1+x}\text{Ni}_a\text{Mn}_b\text{Co}_c\text{Al}_d\text{O}_2 \qquad \text{Formula (B4)},$$

wherein, in Formula (B4), 0≤x≤0.15; a>0; b>0; c>0; d>0; and optionally a+b+c+d=1.

Specific examples of Formula (B) include, for example, NMC (see Formula B1), LNMO (see Formula B2), NCA (see Formula B3), and NMCA (see Formula B4).

As used herein, the general term "NMC" means Formula (B1), the general term "LNMO" means Formula (B2), the general term "NCA" means Formula (B3), and the general term "NMCA" mean Formula (B4).

Specific examples of Formula (B1) include, for example, LiNi$_{0.33}$Mn$_{0.33}$Co$_{0.33}$O$_2$ (NMC 111), LiNi$_{0.5}$Mn$_{0.3}$Co$_{0.2}$O$_2$ (NMC 532), LiNi$_{0.6}$Mn$_{0.2}$Co$_{0.2}$O$_2$ (NMC 622), or LiNi$_{0.8}$Mn$_{0.1}$Co$_{0.1}$O$_2$ (NMC 811).

Formula (C) (LMO)

The second active material may be represented by the following Formula (C):

$$Li_{1+x}Mn_2O_4 \quad \text{Formula (C),}$$

wherein, in Formula (C), 0≤x≤0.15.

As used herein, the general term "LMO" means Formula (C).

Formula (D) (LCO)

The second active material may be represented by the following Formula (D):

$$Li_{1+x}CoO_2 \quad \text{Formula (D),}$$

wherein, in Formula (D), 0≤x≤0.15.

As used herein, the general term "LCO" means Formula (D).

Example Cathode Active Material Blends and Amounts

In aspects of the disclosure, the weight ratio of the LVPF according to the Formula (1) to the second active material is r:(1−r), wherein 0<r<1. In other words, the term "r" corresponds to the weight percent of the LVPF according to the Formula (1) when a total of the LVPF according to the Formula (1) and second active material is considered to be 100%. For example, when r is 0.9, this corresponds to 90 wt. % of the LVPF according to the Formula (1) and 10 wt. % of the second active material.

In the weight ratio r:(1−r), r can be any value greater than 0 and less than 1, and r is not required to be an integer (e.g., r can be 0.75 to 0.85). In certain embodiments, the value for r can be, for example, 0.1≤r≤0.9, 0.2≤r≤0.9, 0.3≤r≤0.9, 0.4≤r≤0.9, 0.5≤r≤0.9, 0.6≤r≤0.9, 0.7≤r≤0.9, 0.8≤r≤0.9, etc.

The following example blended cathode materials of the LVPF according to the Formula (1) with a blend of the second active material are mentioned.

In one aspect, the LVPF according to the Formula (1) may be blended with Formula (A4) (LFMP) as the second active material in the weight ratio r:(1−r). This blend may be useful, for example, for generating a sloped discharge curve to facilitate determining SOC. For example, the second plateau (~3.5V) of the LFMP can serve as a SOC indicator during discharge. In this aspect, r is not particularly limited. However, in certain aspects, r is preferably 0.4≤r≤0.6.

In a modification of this aspect, Formula (A4) (LFMP) may be further blended with Formula (B1) (NMC) as the second active material, wherein a weight ratio of LFMP to NMC in this blend is a:(1−a) (i.e., $LVPF_r(LFMP_aNMC_{1-a})_{1-r}$), where the value a is any value greater than 0 and less than 1 (i.e., 0<a<1). For example, the value a can be 0.1≤a≤0.9, 0.2≤a≤0.8, 0.3≤a≤0.7, or 0.4≤a≤0.6.

In another modification of this aspect, Formula (A4) (LFMP) may be blended with Formula (B3) (NCA) as the second active material, wherein a weight ratio of LFMP to NCA in this blend is b:(1−b) (i.e., $LVPF_r(LFMP_bNCA_{1-b})_{1-r}$), where the value b is any value greater than 0 and less than 1 (i.e., 0<b<1). For example, the value b can be 0.1≤b≤0.9, 0.2≤b≤0.8, 0.3≤b≤0.7, or 0.4≤b≤0.6.

In another aspect, the LVPF according to the Formula (1) may be blended with Formula (B1) (NMC (e.g., NMC111, NMC532, NMC622, NMC811, etc.)) as the second active material in the weight ratio r:(1−r). In this example, the value for r is preferably 0.4≤r≤0.6.

In another aspect, the LVPF according to the Formula (1) may be blended with Formula (B3) (NCA) as the second active material in the weight ratio r:(1−r). In this example, r is preferably 0.4≤r≤0.6.

In another aspect, the LVPF according to the Formula (1) may be added to Formula (A4) (LFMP) as the second active material in the weight ratio r:(1−r) for the purpose of improving one or both of the capacity retention and processability of the LFMP. In this example embodiment, r may be 0.1≤r≤0.6. In this example, the second active material may include another of the second active materials in combination with the LVPF according to the Formula (1) as follows: $LVPF_x(LFMP_aZ_b)_y$, wherein a+b=1, 0<a≤1, 0≤b<1, x+y=1; 0<x<1, 0<y<1, and "Z" is any one of the other second active materials disclosed herein (e.g., NCA, LCO, LNO, LMO, etc.).

Anode (Negative Electrode)

The structure of the anode (or negative electrode) is not particularly limited and known anode active materials can be used, as long as the material can function as the negative electrode active material of the lithium-ion battery. For example, the active material of the anode can include carbon-based negative electrode active materials, such as graphite and coke, alloy-based negative electrode active materials such as Si and/or Sn, $SiO_x$, a lithium metal, a lithium titanate oxide (LTO), titanium niobium oxide ($TiNb_2O_7$) (TNO), or a blend thereof. The anode active material can include particles of one these materials coated with a layer of conductive carbon (e.g., graphitic carbon) (e.g., particles of $SiO_x$, coated with carbon).

Similar to the cathode, the anode material can include the anode active material and a binder, and the anode material can be applied to a current collector. In a preferred embodiment, the anode active material of the present disclosure can account for 50 wt % to 99 wt % of the anode material (or any amount within this range, e.g., 95 wt % to 99 wt %, or 97 wt % to 99 wt %) of the anode material.

Electrolytic Solution

The electrolytic solution can be a known non-aqueous electrolytic solution, which includes a supporting salt (e.g., a lithium salt) dissolved in a solvent.

The lithium salt is not particularly limited and known lithium salts for use in non-aqueous lithium-ion batteries can be used. In preferred embodiments, the electrolyte salt may include one or more of lithium bis(fluorosulfonyl)imide ("LiFSI"), lithium bis(trifluoromethanesulfonyl)imide ("LiTFSI"), $LiBF_4$, lithium bis(oxalato)borate ("LiBOB"), $LiClO_4$, $LiAsF_6$, $LiPF_6$, $LiCF_3SO_3$, $LiAlCl_4$, lithium 4,5-dicyano-2-(trifluoromethyl)imidazole ("LiTDI"), $LiPO_2F_2$, and the like.

In some aspects, the lithium salt concentration in the electrolytic solution may be more than 0.8M, more than 1.0M, more than 1.2M, more than 1.4M, more than 1.5M, more than 1.6M, more than 1.7M, more than 1.8M, or more than 2.0M. In some aspects, the salt concentration may be less than 4.0M, less than 3.6M, less than 3.2M, less than 2.8M, less than 2.4M, less than 2.0M, less than 1.6M, or less than 1.2M.

The solvent is not particularly limited and known solvents for non-aqueous lithium-ion batteries may be used. The solvent can be a single solvent or a mixture of a plurality solvents. The solvent may be selected from usual organic solvents, notably saturated cyclic carbonates, unsaturated cyclic carbonates, non-cyclic (or linear) carbonates, alkyl esters such as formates, acetates, propionates or butyrates, ethers, lactones such as gamma-butyrolactone, tetrahydrothiophene bioxide, nitrile solvents and mixtures thereof. Among such saturated cyclic carbonates, specific mention may be made, for example, of ethylene carbonate (EC), propylene carbonate (PC), butylene carbonate (BC), and mixtures thereof. Among unsaturated cyclic carbonates, specific mention may be made, for example, of vinylene carbonate (VC), its derivatives and mixtures thereof. Among non-cyclic carbonates, specific mention may be made, for example, of dimethyl carbonate (DMC), diethyl carbonate (DEC), ethyl methyl carbonate (EMC), dipropyl carbonate (DPC) and mixtures thereof. Among the alkyl esters, specific mention may be made, for example, of methyl acetate, ethyl acetate, methyl propionate, ethyl propionate, butyl propionate, methyl butyrate, ethyl butyrate, propyl butyrate and mixtures thereof. Among the ethers, mention may for example be made of dimethyl ether (DME) or diethyl ether (DEE), and mixtures thereof. Known fluorinated solvents can also be used, including, for example, fluorinated benzenes (such as hexafluorobenzene, pentafluorobenzene, 1,2,3,4-tetrafluorobenzene, etc.), fluorine substituted linear carbonates, etc.

The electrolytic solution may include a known additive for use in a non-aqueous lithium-ion battery.

One type of additive that may be included in the electrolytic solution is a gas-generation agent used for implementing a pressure-type current interrupt device (CID). Exemplary gas-generation agents include cyclohexylbenzene (CHB), biphenyls, and fluorinated biphenyls having an oxidation potential lower than that of the solvent in the electrolyte solution. When the lithium-ion battery reaches an overcharged state, the compound reacts to generate gas before the electrolyte solution decomposes. When included, the amount of the gas-generation agent is preferably 0.01 wt % to 10 wt % (or any amount within this range, such as, for example, 0.1 wt % to 5 wt %; or 1 wt % to 3 wt %).

Specific mention can also be made to the use of known film-forming additives for forming a solid-electrode interphase (SEI) film on the anode or cathode. For example, one such additive includes fluorinated compound additives, such as fluorinated ethylene carbonate (FEC). When included, FEC (and/or another additive) can be added to the solvent in an amount of 0.1 to 20 wt % based on the total weight of the solvent, or can be added in any amount with this range, such as, for example, 1 to 10 wt %, 2 to 9 wt %, 3 to 8 wt %, 4 to 7 wt %, 5 to 6 wt %, 1 to 5 wt %, 1 to 4 wt %, 1 to 3 wt %, 1 to 2 wt %, 2 to 3 wt %, or 0.1 to 1 wt %.

Separator

The use of a separator is not particularly limited and known separators for secondary batteries can be used. Separators are placed between both electrodes, and typically is not electronically conductive but with mechanical and thermal stability.

Conventional categories of separators include microporous membranes, nonwoven membranes, electrospun membranes, membranes with external surface modification, composite membranes, and polymer blends. In one embodiment, the separator is a microporous membrane made of a polyolefin-based material, such as, for example, a microporous membrane made of polyethylene (PE), polypropylene (PP) or the like.

In some embodiments, the battery may not contain an electrolytic solution and a separator. Instead, a solid electrolyte layer can be used that meets the function of both the separator and the electrolytic solution (i.e., a solvent-free electrolyte), such as a solid ion-conducting polymer that is in contact with both the negative electrode and the positive electrode. Solid electrolytes rely on ion hopping through rigid structures. Solid electrolytes may be also referred to as fast ion conductors or super-ionic conductors. Solid electrolytes may be also used for electrically insulating the positive and negative electrodes of a cell while allowing for the conduction of ions, e.g., $Li^+$, through the electrolyte. In this case, a solid electrolyte layer may be also referred to as a solid electrolyte separator.

The use of a solid electrolyte separator is not particularly limited. Known solid electrolytes include polymer-based materials (e.g., polyethylene oxide (PEO), PEO-based materials (e.g., PEO-PPO, PEO-epichlorohydrin, methyleneoxy-PEO, PEO-PAAM, PEO-PMHS (polymethylhydrogen-siloxane), etc.)), ceramic-based materials, sulfide-based materials, and cellulose based materials.

Battery Module, Pack and System

A battery module according to the present disclosure is a structure containing multiple secondary cells arranged side by side in a common casing; a battery pack is a structure containing a plurality of electrically connected battery modules; and a battery system is a structure containing a plurality of electrically connected cells or battery modules. A battery module or pack may contain one or more control systems (e.g., BMS).

It is well known and understood how to electrically connect secondary cells in series and in parallel. Several techniques are disclosed, for example, in U.S. Publication No. 2019/0123315 (the '315 application) and U.S. Publication No. 2019/0165584 (the '584 application), which are incorporated herein by reference for their disclosure of techniques for assembling a plurality of electrochemical cells and modules. Further, a battery system may comprise additional structure, including a BMS and a cooling system.

State of Charge

It is well known in the art how to determine the state of charge (SOC) of secondary cells based on cell voltage, and battery management systems (BMS) configured to determine SOC based on cell voltage are also well known. Methods of cell monitoring and balancing are also well known in the art. For example, such methods are discussed in U.S. Publication No. 2010/0253277 (the '277 application) and U.S. Publication No. 2015/0115736 (the '736 application), which are incorporated by reference herein for their discussion of cell monitoring and balancing, including hardware and programming for accomplishing this function.

Battery modules and/or battery systems of the present disclosure may include a known BMS, which is configured, for example, with known programing (e.g., algorithms) for determining SOC. Alternatively, battery modules and systems of the present disclosure may be configured to be operated and/or monitored by an external BMS.

Methods of Pre-Lithiation

As explained above, the present disclosure provides pre-lithiation methods using the LVPF according to the Formula (1). For example, the pre-lithiation methods can utilize the two voltage plateaus of lithium vanadium fluorophosphate to safely provide the battery with excess lithium, thereby compensating for lithium loss on the anode side. Furthermore, the lithium released from 4.2V plateau (and/or the lithium released from the optional second cathode active material) can potentially be fully used in following cycles to improve cycling efficiency and stability.

The pre-lithiation method includes the following steps (A), (B), and (C).

Pre-Lithiation Step (A)

Step (A) of the pre-lithiation includes a determination of the expected capacity loss of the battery due to a loss of lithium during a first cycle and/or cycles following the first cycle. In some aspects, the step (A) may include determining the expected first cycle capacity loss; determining the expected capacity loss in cycles after the first cycle; or determining a total capacity loss of the expected first cycle capacity loss with the capacity loss in the cycles following the first cycle.

As explained above, it is well known that active lithium is lost during the initial charging of the lithium-ion battery, particularly from the formation of a solid electrolyte interphase (SEI) on a surface of the anode.

A person of ordinary skill in the art would understand how to determine or estimate the capacity loss due to a loss lithium. For example, in one aspect, the suppliers of anode active materials may indicate an expected first cycle irreversible efficiency or capacity. Alternatively, the expected capacity loss could be determined by assembling and testing a lithium-ion battery having a specific chemistry. The capacity loss of a designed cell is the difference between the first charge capacity and the first discharge capacity. Alternatively, the capacity loss of a designed cell is the difference between the first charge capacity and the discharge capacity of any interested cycle and the capacity loss prior to this cycle could be compensated by pre-lithiation.

Pre-Lithiation Step (B)

Step (B) of the pre-lithiation includes adjusting a degree of pre-lithiation of the battery to compensate for the expected capacity loss. The step (B) may include the following steps in combination: Step (B1) of selecting a value for x in the Formula (1), and step (B2) of selecting a total amount of the LVPF according to the Formula (1) in the cathode. Essentially, selecting a value for x in step (B1) adjusts the lithiation level of the LVPF (i.e., an amount of pre-lithiation of the LVPF to be used in the cathode), and selecting the amount in step (B2) adjusts the total excess amount of lithium that should be made available from the LVPF according to the Formula (1) during initial cycles to compensate for loss of active lithium.

As explained above, step (B1) is not particularly limited. In one aspect, step (B1) can be performed by chemically synthesizing the LVPF according to the Formula (1) having the selected value for x. One example for synthesizing the LVPF according to Formula (1) may include adding additional lithium to $Li_1VPF$ or during $Li_1VPF$ synthesis (this provides the LVPF according to Formula (1) having the selected value for x where the LVPF may be in solid solution form and/or may be a mixture of two or more phases (e.g., $Li_1VPF$ (or $Li_1$ phase) and $Li_2VPF$ (or $Li_2$ phase))). In another aspect, step (B1) can be obtained by physically mixing two or more lithium vanadium fluorophosphate materials (e.g., a mix of $(1-X)Li_1VPF+(X)Li_2VPF$ where $0<X<1$) so that the blend will have the chemistry of the LVPF according to the Formula (1) having the selected value for x (again, this provides the LVPF according to Formula (1) having the selected value for x where the LVPF may be in solid solution form and/or may be a mixture of two or more phases (e.g., $Li_1$ and $Li_2$ phases)).

In some aspects, the total amount of the cathode active material including the LVPF according to Formula (1) (in combination with the optional second cathode active material) may fall within a range of about 1 mg/cm² to about 50 mg/cm² per side, and the actual amount may be any value within this range (e.g., about 1 to 10 mg/cm² per side, about 11 to 20 mg/cm² per side, about 21 to 30 mg/cm² per side, about 31 to 40 mg/cm² per side, or about 41 to 50 mg/cm² per side.

When the cathode active material includes only the LVPF according to the Formula (1), these amounts refer to only the LVPF according to the Formula (1). When the cathode active material further includes the optional second cathode active material, these amounts refer to the total amount of the LVPF according to the Formula (1) and the second cathode active material. For example, if the total is about 10 mg/cm² per side, and the cathode active material is $LVPF_rLFMP_{1-r}$ and r is 0.3, this means that the amount of the LVPF according to the Formula (1) is about 3 mg/cm² per side and the amount of the LFMP is about 7 mg/cm² per side.

Pre-Lithiation Step (C)

Step (C) of the pre-lithiation includes preparing a cathode containing as a cathode active material the total amount of the LVPF according to the Formula (1) determined in the step (B). Of course, the step (C) may further include mixing the LVPF with a second cathode active material, a binder, and/or an electron conductive agent.

EXAMPLES

In the following, although embodiments of the present disclosure are described in further detail by means of Examples, the present disclosure is not limited thereto.

Example 1

In Example 1, three single layer pouch cells were prepared having the configurations set forth in Table 1. In Table 1, Cell 1A is an embodiment of a pre-lithiated LVPF cathode, and Cells 1B and 1C are control cells.

For the cathodes, the total amount of the cathode active material loaded on the current collector was about 8.4 mg/cm² for an energy density of about 1.1 mAh/cm².

For the anodes, the total amount of the anode active material loaded on the current collector was about 6.5 mg/cm² for an energy density of about 2.2 mAh/cm².

TABLE 1

| Cell # | Cathode Material (wt %) | Anode (wt %) | Electrolyte Salt & Solvent (vol. ratio) |
| --- | --- | --- | --- |
| 1A | $Li_2VPO_4F$ (94.5%) Carbon nanotubes (1%) PVDF binder (4.5%) | Graphite (97%) CMC-SBR binder (3%) | 1M $LiPF_6$ EC/EMC/DMC (1:1:1) +2 wt % VC |
| 1B | $LiVPO_4F$ (94.5%) Carbon nanotubes (1%) PVDF binder (4.5%) | Graphite (97%) CMC-SBR binder (3%) | 1M $LiPF_6$ EC/EMC/DMC (1:1:1) +2 wt % VC |
| 1C | $LiVPO_4F$ (94.5%) Carbon nanotubes (1%) PVDF binder (4.5%) | Graphite (97%) CMC-SBR binder (3%) | 1M $LiPF_6$ EC/EMC/DMC (1:1:1) +2 wt % VC |

Figure 2:
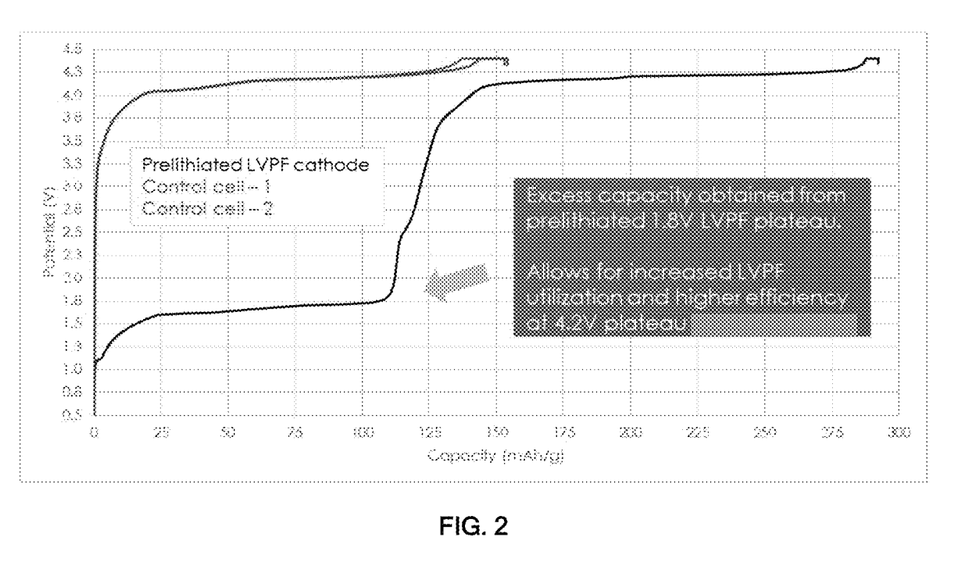
FIG. 2 is a chart showing voltage (V) vs. capacity (mAh/g) during charging of the cells obtained in Example 1.

The cells were then charged at a current equivalent to 0.2 C with a cut-off current of 0.01 C, where C is the cell capacity, up to 4.4V to provide the potential (V) vs. capacity (mAh/g) curves shown in FIG. 2.

As shown in FIG. 2, the lower voltage plateau of about 1.8V of the pre-lithiated Cell 1A has an energy density of about 140 mAh/g and can be utilized to obtain excess capacity of active lithium. That is, the excess lithium of the pre-lithiated LVPF can be used to meet the lithium lost at the anode during initial cycling of the battery.

Figure 3:
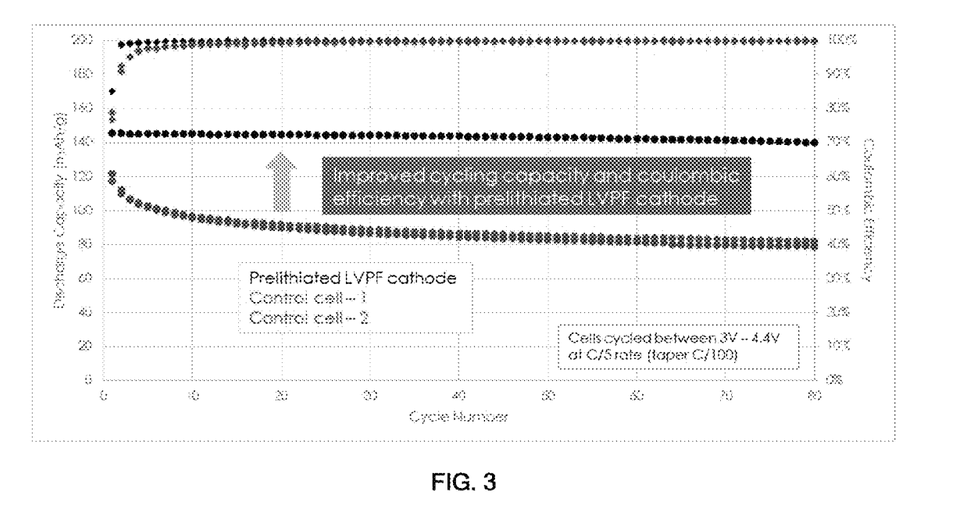
FIG. 3 is a chart showing both discharge capacity (mAh/g) vs. cycle number & coulombic efficiency (%) vs. cycle number for the cells obtained in Example 1.

The cells were then cycled about 3V to 4.4V at a current equivalent to 0.2 C with a cut-off current of 0.01 C, where C is the cell capacity, to obtain the curves shown in FIG. 3.

As shown in FIG. 3, Cell 1A having the pre-lithiated LVPF showed substantially improved cyclic capacity, essentially maintaining a discharge capacity of about 140 mAh/g (which corresponds to the theoretical or design capacity for LVPF) from the first cycle to the eightieth cycle.

In contrast, the non-pre-lithiated control Cells 1B and 1C not only showed a substantially reduced discharge capacity of about 120 mAh/g after the first cycle, but also showed a slow capacity fade throughout the subsequent cycles.

FIG. 3 also shows the coulombic efficiency for Cells 1A, 1B, and 1C throughout the cycle test. As shown in FIG. 3, the pre-lithiated Cell 1A showed improved coulombic efficiency ($Ah_{IN}$-$Ah_{OUT}$) over the first several cycles. This is because the lithium introduced by pre-lithiation through LVPF (a certain amount of the lithium from pre-lithiation may stay in anode after formation) compensates the lithium loss during SEI formation, leading to higher discharge capacity, as well as coulombic efficiency over the first several cycles comparing to the non-pre-lithiated cell.

Example 2

In Example 2, two single layer cells were prepared having the configurations set forth in Table 2. In Table 2, Cell 2A is an embodiment of a pre-lithiated LVPF cathode containing LFMP, and Cell 2B is a control cell.

For the cathodes, the total amount of the cathode active material loaded on the current collector was about 13 mg/cm² for an energy density of about 1.8 mAh/cm².

For the anodes, the total amount of the anode active material loaded on the current collector was about 6.5 mg/cm² for an energy density of about 2.2 mAh/cm².

Figure 4:
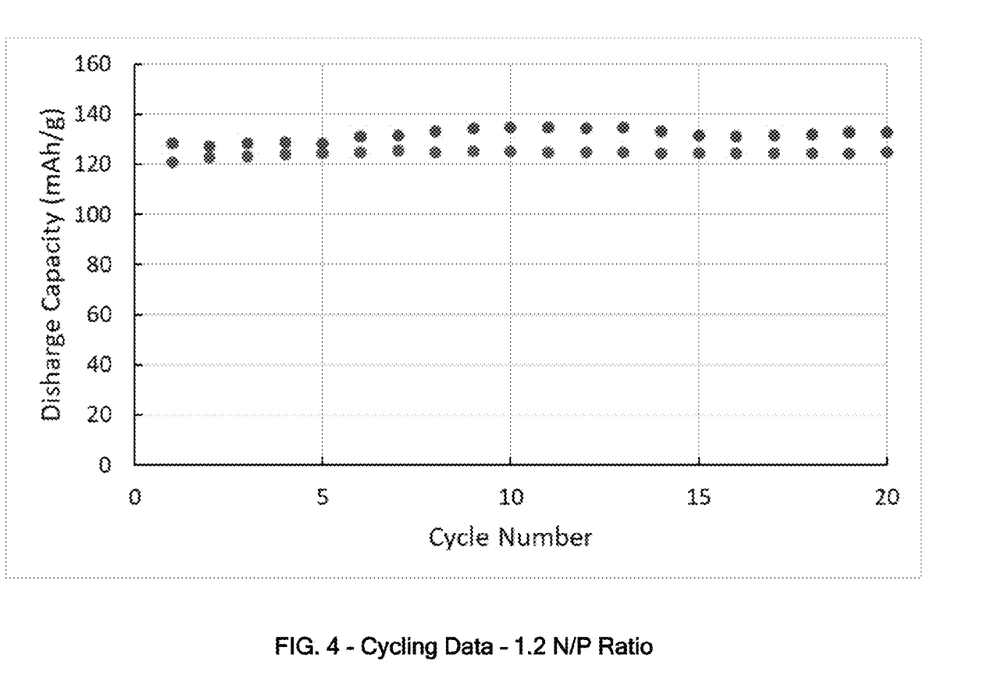
FIG. 4 is a chart showing discharge capacity (mAh/g) vs. cycle number for the blend of LVPF with LFMP in the cells obtained in Example 2.

The cells were then cycled about 3V to 4.4V at a current equivalent to 0.2 C with a cut-off current of 0.01 C, where C is the cell capacity, to obtain the curves shown in FIG. 4.

As shown in FIG. 4, Cell 2A containing 28.35% of the pre-lithiated LVPF showed substantially improved cyclic capacity, 8.1 mAh higher at the 20$^{th}$ cycle.

Example 3

In Example 3, two single layer pouch cells were prepared having the configurations set forth in Table 3. In Table 3, Cell 3A is an embodiment of a pre-lithiated LVPF cathode containing LFMP, and Cell 3B is a control cell. Comparing to Example 2, the cells in Example 3 had a higher N/P ratio (1.3 vs. 1.2), which results in more initial lithium loss in cells without pre-lithiation.

For the cathodes, the total amount of the cathode active material loaded on the current collector was about 12.3 mg/cm² for an energy density of about 1.7 mAh/cm².

For the anodes, the total amount of the anode active material loaded on the current collector was about 6.5 mg/cm² for an energy density of about 2.2 mAh/cm².

TABLE 3

| Cell # | Cathode Material (wt %) | Anode (wt %) | Electrolyte Salt & Solvent (vol. ratio) |
|---|---|---|---|
| 3A | $Li_2VPO_4F$ (28.35%) $LiMn_{0.75}Fe_{0.25}PO_4$ (66.15%) Carbon nanotubes (1% dry) PVDF binder (4.5% dry) | Graphite (97.00%) CMC-SBR binder (3%) | 1M $LiPF_6$ EC/EMC/DMC (1:1:1) +2 wt % VC |
| 3B | $LiVPO_4F$ (28.35%) $LiMn_{0.75}Fe_{0.25}PO_4$ (66.15%) Carbon nanotubes (1% dry) PVDF binder (4.5% dry) | Graphite (97.00%) CMC-SBR binder (3%) | 1M $LiPF_6$ EC/EMC/DMC (1:1:1) +2 wt % VC |

Figure 5:
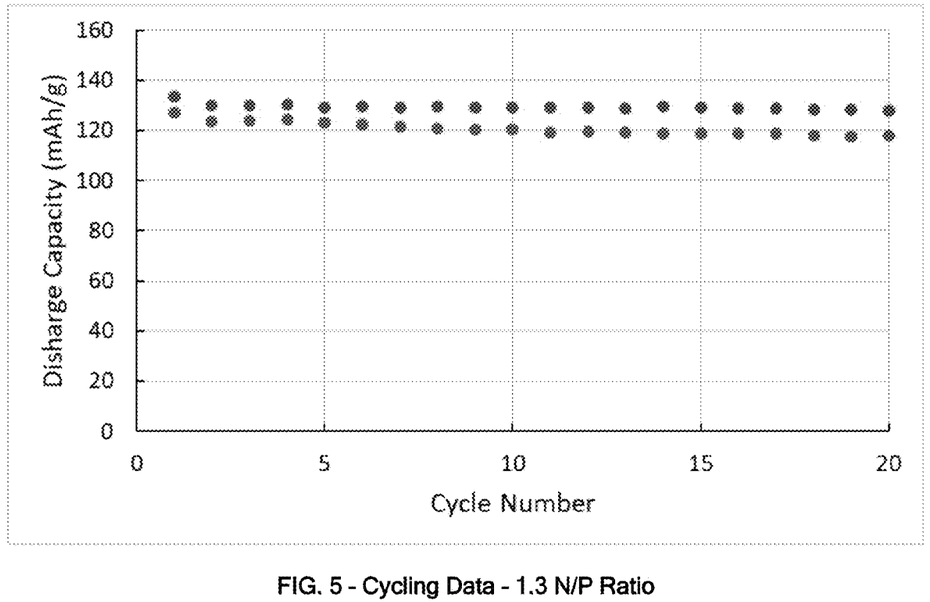
FIG. 5 is a chart showing discharge capacity (mAh/g) vs. cycle number for the blend of LVPF with LFMP in the cells obtained in Example 2.

The cells were then cycled about 3V to 4.4V at a current equivalent to 0.2 C with a cut-off current of 0.01 C, where C is the cell capacity, to obtain the curves shown in FIG. 5.

As shown in FIG. 5, Cell 3A containing 28.35% of the pre-lithiated LVPF showed substantially improved cyclic capacity, about 10.4 mAh higher at the 20$^{th}$ cycle.

The disclosure is susceptible to various modifications and alternative means, and specific examples thereof are herein described in detail. It should be understood, however, that the disclosure is not to be limited to the particular examples or methods disclosed, but to the contrary, the disclosure is to cover all modifications, equivalents, and alternatives falling within the spirit and scope of the claims.

The invention claimed is:

1. A method of making a lithium-ion battery comprising a cathode, an anode, and an electrolytic solution, the cathode comprising a cathode active material including a lithium vanadium fluorophosphate represented by the following Formula (1):

$$Li_{1+x}V_{1-y}M_yPO_4F_z \qquad \text{Formula (1),}$$

TABLE 2

| Cell # | Cathode Material (wt %) | Anode (wt %) | Electrolyte Salt & Solvent (vol. ratio) |
|---|---|---|---|
| 2A | $Li_2VPO_4F$ (28.35%) $LiMn_{0.75}Fe_{0.25}PO_4$ (66.15%) Carbon nanotubes (1% dry) PVDF binder (4.5% dry) | Graphite (97.00%) CMC-SBR binder (3%) | 1M $LiPF_6$ EC/EMC/DMC (1:1:1) +2 wt % VC |
| 2B | $LiVPO_4F$ (28.35%) $LiMn_{0.75}Fe_{0.25}PO_4$ (66.15%) Carbon nanotubes (1% dry) PVDF binder (4.5% dry) | Graphite (97.00%) CMC-SBR binder (3%) | 1M $LiPF_6$ EC/EMC/DMC (1:1:1) +2 wt % VC | wherein, in Formula (1), $0.05 < x \le 1$; $0 \le y \le 0.5$; $0.8 \le z \le 1.2$; and M is one or more selected from the group consisting of Ti, Al, Mg, Mn, Fe, Co, Y, Cr, Cu, Ni, and Zr, the method of making the battery comprising:

(A) determining an expected capacity loss of the battery due to a loss of lithium during a first cycle and/or cycles following the first cycle;

(B) adjusting a degree of pre-lithiation to compensate for the expected capacity loss by:
 (B1) selecting a value for x in the Formula (1), and
 (B2) selecting a total amount of the lithium vanadium fluorophosphate in the cathode;

(C) preparing the cathode comprising the total amount of lithium vanadium fluorophosphate; and (D) assembling the battery, wherein the cathode active material further comprises a second cathode active material in a mixture with the lithium vanadium fluorophosphate;

a weight ratio of the lithium vanadium fluorophosphate according to Formula (1) to the second cathode active material is r: (1−r), wherein $0 < r < 1$; and the second cathode active material is represented by one of the following Formulas (A) to (D) or a blend thereof:

$$Li_{1+x}M1_aX_bPO_4 \qquad \text{Formula (A)},$$

wherein, in Formula (A), M1 is at least one selected from the group consisting of Fe, Mn, and Co; X is at least one transition metal selected from the group consisting of Ni, V, Y, Mg, Ca, Ba, Al, Sc, and Nd; $0 \le x \le 0.15$; $a > 0$; $b \ge 0$; and optionally $a+b=1$, $$Li_{1+x}Ni_aM2_dM3_eO_2 \qquad \text{Formula (B)},$$

wherein, in Formula (B), M2 is at least one selected from the group consisting of Co, Al, and Mn; M3 is one or more selected from the group consisting of B, Mg, Si, Ca, Ti, V, Cr, Mn, Fe, Cu, Zn, Y, Zr, Nb, W, Mo, Sr, Ce, Ga, and Ta; $0 \le x \le 0.15$; $a > 0$; $d > 0$; $e \ge 0$; and optionally $a+d+e=1$, $$Li_{1+x}Mn_2O_4 \qquad \text{Formula (C)},$$

wherein, in Formula (C), $0 \le x \le 0.15$, $$Li_{1+x}CoO_2 \qquad \text{Formula (D)},$$

wherein, in Formula (D), $0 \le x \le 0.15$.

2. The method according to claim 1, wherein the step (B) of adjusting the degree of pre-lithiation provides a first cycle reversible capacity 85% or above of designed or theoretical reversible capacity.

3. The method according to claim 1, wherein a first cycle reversible capacity is at least 85% of designed capacity or theoretical capacity.

4. The method according to claim 2, wherein a second cycle design capacity is at least 96% to design capacity.

5. The method according to claim 1, further comprising: performing the first cycle by:
(E) initially charging the battery at a charge plateau of about 1.5-2.0 V vs. $Li^+/Li$ ($V^{3+}/V^{2+}$ redox pair); and
(F) subsequently charging the battery at a charge plateau of about 4.0-4.3 V vs. $Li^+/Li$ ($V^{4+}/V^{2+}$ redox pair).

6. The method according to claim 5, further comprising: after charging the battery in (F) at the charge plateau of about 4.0-4.3 V;
repeatedly cycling the battery between about 3 V to 4.2-4.5 V.

7. The method according to claim 5, wherein lithium released from the lithium vanadium fluorophosphate during the initial charging compensates for the loss of lithium.

8. The method according to claim 1, wherein the lithium vanadium fluorophosphate represented by the Formula (1) is $Li_{1+x}VPO_4F$.

9. The method according to claim 1, wherein selecting the value for x in (B1) comprises obtaining the lithium vanadium fluorophosphate represented by the Formula (1) having the value for x.

10. The method according to claim 1, wherein selecting the value for x in (B1) comprises synthesizing the lithium vanadium fluorophosphate represented by the Formula (1) having the value for x, wherein the lithium vanadium phosphate obtained by the synthesis may be in solid solution form and/or a mixture of an $Li_1$ phase and a $Li_2$ phase.

11. The method according to claim 1, wherein selecting the value for x in (B1) comprises blending a lithium vanadium fluorophosphate represented by the following Formula (2) with a lithium vanadium fluorophosphate represented by the following Formula (3):

$$Li_{1+a}V_{1-y1}M_{y1}PO_4F_{z1} \qquad \text{Formula (2)},$$

$$Li_{2-b}V_{1-y2}M_{y2}PO_4F_{z2} \qquad \text{Formula (3)},$$

wherein, in Formula (2) and Formula (3), $0 \le y1 \le 0.5$; $0 \le y2 \le 0.5$; $0.8 \le z1 \le 1.2$; $0.8 \le z2 \le 1.2$; $0 \le a \le 1$; and $0 \le b \le 1$, when a ratio between the Formula (2) and the Formula (3) is r:(1−r), the x in Formula (1) would be $((1+a)*r) + ((2-b)*(1-r)) - 1$, wherein $0 < r < 1$.

12. The method according to claim 1, wherein the second cathode active material is represented by a blend of two or more of the Formulas (A) to (D).

13. The method according to, claim 1, wherein the second cathode active material is represented by one of the following Formula (A1) to (A4) or a blend thereof:

$$Li_{1+x}FePO_4 \qquad \text{Formula (A1)},$$

wherein, in Formula (A1), $0 \le x \le 0.15$;

$$Li_{1+x}MnPO_4 \qquad \text{Formula (A2)},$$

wherein, in Formula (A2), $0 \le x \le 0.15$;

$$Li_{1+x}CoPO_4 \qquad \text{Formula (A3)},$$

wherein, in Formula (A3), $0 \le x \le 0.15$;

$$Li_{1+x}Fe_yMn_zX_bPO_4 \qquad \text{Formula (A4)},$$

wherein, in Formula (A4), X is at least one transition metal selected from the group consisting of Ni, V, Y, Mg, Ca, Ba, Al, Sc, and Nd; $0 \le x \le 0.15$; $y > 0$; $z > 0$; $b \ge 0$; and optionally $y+z+b=1$.

14. The method according to, claim 1, wherein the second cathode active is represented by one of the following Formula (B1) to (B4) or a blend thereof:

$$Li_w(Ni_xMn_yCo_zM_t)O_2 \qquad \text{Formula (B1)},$$

wherein, in Formula (B1), $0.9 \le w \le 1.1$; $x > 0$; $y > 0$; $z > 0$; $t \ge 0$; M is one or more selected from the group consisting of Al, B, Mg, Si, Ca, Ti, V, Cr, Fe, Cu, Zn, Y, Zr, Nb, W, Mo, Sr, Ce, Ga, and Ta; and optionally $x+y+z+t=1$, $$Li_{1+x}Ni_aMn_bO_2 \qquad \text{Formula (B2)},$$

wherein, in Formula (B2), $0 \le x \le 0.15$; $a > 0$; $b > 0$; and optionally $a+b=1$, $$Li_w(Ni_xCo_yAl_zM_t)O_2 \qquad \text{Formula (B3)},$$

wherein, in Formula (B3), $0.9 \le w \le 1.1$; $x > 0$; $y > 0$; $z > 0$; $t \ge 0$; M is one or more selected from the group consisting of B, Mg, Si, Ca, Ti, V, Cr, Mn, Fe, Cu, Zn, Y, Zr, Nb, W, Mo, Sr, Ce, Ga, and Ta; and optionally $x+y+z+t=1$, $$Li_{1+x}Ni_aMn_bCo_cAl_dO_2 \qquad \text{Formula (B4)},$$

wherein, in Formula (B4), 0≤x≤0.15; a>0; b>0; c>0; d>0; and optionally a+b+c+d=1.

15. The method according to claim 1, wherein the anode comprises one or more anode active materials selected from the group consisting of graphite, coke, Si, Sn, silicon oxide, lithium metal, lithium titanate oxide (LTO), and titanium niobium oxide (TNO).

16. The method according to claim 1, wherein determining the expected first cycle capacity loss in (A) comprises quantifying capacity loss due to formation of a solid electrolyte interphase (SEI) layer on the anode during the first cycle and/or the cycles following the first cycle.

17. The method according to claim 1, wherein 5-20% of lithium from the cathode active material is lost in the first cycle, and selecting the value for x in the Formula (1) in (B1) and selecting the total amount of the lithium vanadium fluorophosphate in (B2) compensates for substantially all of the lithium lost in the first cycle.

18. The method according to claim 1, wherein selecting the value for x in the Formula (1) in (B1) and selecting the total amount of the lithium vanadium fluorophosphate in (B2) compensates for substantially all the lithium lost in the first cycle and the cycles following the first cycle.

19. The method according to claim 1, wherein selecting the value for x in the Formula (1) in (B1) and selecting the total amount of the lithium vanadium fluorophosphate in (B2) compensates for all of the lithium lost in the first cycle and the following the first cycle.

\* \* \* \* \*